(12) United States Patent
Van Loosdrecht et al.

(10) Patent No.: US 6,383,390 B1
(45) Date of Patent: *May 7, 2002

(54) METHOD OF TREATING AMMONIA-COMPRISING WASTE WATER

(75) Inventors: Marinus Cornelis Maria Van Loosdrecht, De Lier; Michael Silvester Maria Jetten, Nijmegen, both of (NL)

(73) Assignee: Technische Universiteit Delft, Delft (NL)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/242,643
(22) PCT Filed: Aug. 25, 1997
(86) PCT No.: PCT/NL97/00482
    § 371 Date: Sep. 22, 1999
    § 102(e) Date: Sep. 22, 1999
(87) PCT Pub. No.: WO98/07664
    PCT Pub. Date: Feb. 26, 1998

(30) Foreign Application Priority Data

Aug. 23, 1996 (NL) .............................. 1003860
Feb. 21, 1997 (NL) .............................. 1005343

(51) Int. Cl.⁷ ............................................. C02F 3/00
(52) U.S. Cl. ................................................ 210/630
(58) Field of Search ........................... 210/614, 605, 210/616, 617, 620, 630, 743, 903, 150

(56) References Cited

U.S. PATENT DOCUMENTS 3,846,289 A * 11/1974 Jeris
4,009,099 A * 2/1977 Jeris
5,078,884 A * 1/1992 Mulder
5,094,752 A * 3/1992 Davis .......................... 210/614
5,342,522 A * 8/1994 Marsman ..................... 210/605
5,364,537 A * 11/1994 Paillard ....................... 210/743
5,520,812 A * 5/1996 Ryhiner ....................... 210/614
5,863,435 A * 1/1999 Heijnen ....................... 210/605
5,972,220 A * 10/1999 Bailey ......................... 210/605

FOREIGN PATENT DOCUMENTS

DE          39 39 732 A        6/1991

OTHER PUBLICATIONS

Strous, M., et al., *Nature*, vol. 400, pp. 446–449 (Jul. 29, 1999).

Arno Schrauwers, Eenreaactor stistofverwijderingsproces Paart Eenvoud aan Schoonheid, *Delft Integraal*, vol. 12, No. 1, (1995), DELFT–NL, pp. 3–7, Xp002030429.

* cited by examiner

Primary Examiner—Chester T. Barry
(74) Attorney, Agent, or Firm—Jeffrey D. Myers

(57) ABSTRACT

The invention relates to a method of treating ammonia-comprising waste water in which the bicarbonate ion is the counter ion of the ammonium ion present in the waste water. According to the invention half the ammonium is converted into nitrite, yielding an ammonia and nitrite-containing solution, and in the second step the nitrite is used as oxidant for the ammonia. In the method according to the invention the conversion of half the ammonia into nitrite occurs automatically, providing a method which requires fewer controls. Also, the method according to the invention requires no external additive.

4 Claims, 2 Drawing Sheets

FORMULA SHEET

$$4\ NH_4^+ + 4\ HCO_3^- + 3\ O_2 \rightarrow 2\ N_2 + 4\ CO_2 + 10\ H_2O \quad (I)$$

$$2\ NH_4^+ + 3\ O_2 \rightarrow 2\ NO_2^- + 4\ H^+ + 2\ H_2O \quad (II)$$

$$HCO_3^- \rightarrow CO_2\uparrow + OH^- \quad (III)$$

$$NH_4^+ + NO_2^- \rightarrow N_2\uparrow + 2\ H_2O \quad (IV)$$

FIG-2

METHOD OF TREATING AMMONIA-COMPRISING WASTE WATER

The present invention relates to a method of treating ammonia-comprising waste water, wherein in a first step ammonia-comprising waste water is subjected to a nitrification reaction treatment by using a nitrifying microorganism and by the addition of oxygen, yielding a solution comprising an oxidation product of ammonia, and in a second step the oxidation product of ammonia together with ammonia is converted into nitrogen, through the influence of a denitrifying microorganism.

Such a method is known from U.S. Pat. No. 5,078,884. The nitrate formed by the oxidation of ammonia is used as an oxidant to convert, under substantially anaerobic conditions and with the aid of a microorganism, still to be degraded ammonia which acts as electron donor. During this process nitrogen is formed which is discharged into the atmosphere.

The disadvantage of this method is that there is no reliable degradation of ammonia, as can be seen in (the right half of) FIG. 2 of said publication. This means that undesirable discharges into the surface water may take place. To prevent this, all kinds of investments such as control and measuring equipment would be required. Finally, this method involves the addition of lye (see reaction equation 5 of said publication), which must also be controlled.

The objective of the present invention is to improve the method according to the preamble and in particular to provide a cost-effective, more reliable method which requires no additives and partly because of that, is simpler from a control-technological point of view.

Surprisingly, this objective can be achieved by a method which is characterized in that by using bicarbonate-containing waste water which is substantially stripped of bicarbonate by the supply of air, and in the first step maintaining the pH at $\leq 7.2$ by controlling the aeration, part of the ammonia present in the waste water is converted into nitrite, yielding a nitrite-containing solution, and in the second step the denitrifying microorganism uses the thus formed nitrite as oxidant for the remaining ammonia.

In this manner a method is provided offering considerable advantages, one of which being a substantially more self-regulatory nature. Moreover, the use of additives is avoided.

From the prior art a method is known, comprising a nitritification step in which ammonia is converted into nitrite. In a denitritification step the nitrite is converted into nitrogen while an organic carbon source is added as substrate for a denitritifying organism. As organic carbon source methanol is used. When said methanol is degraded, acid, formed during the nitritification step, is consumed, providing the pH control of the denitritification process. The disadvantage of this non-continuous method is that an additive is required and much control is required such as time control and substrate feed control. The total conversion of ammonia is not under all conditions satisfactory and is limited to at the most 90% and for this reason a subsequent treatment is often required.

BRIEF DESCRIPTION OF THE SEVERAL VIEWS OF THE DRAWINGS

FIG. 2 is a chemical formula sheet according to the invention.

Figure 1:
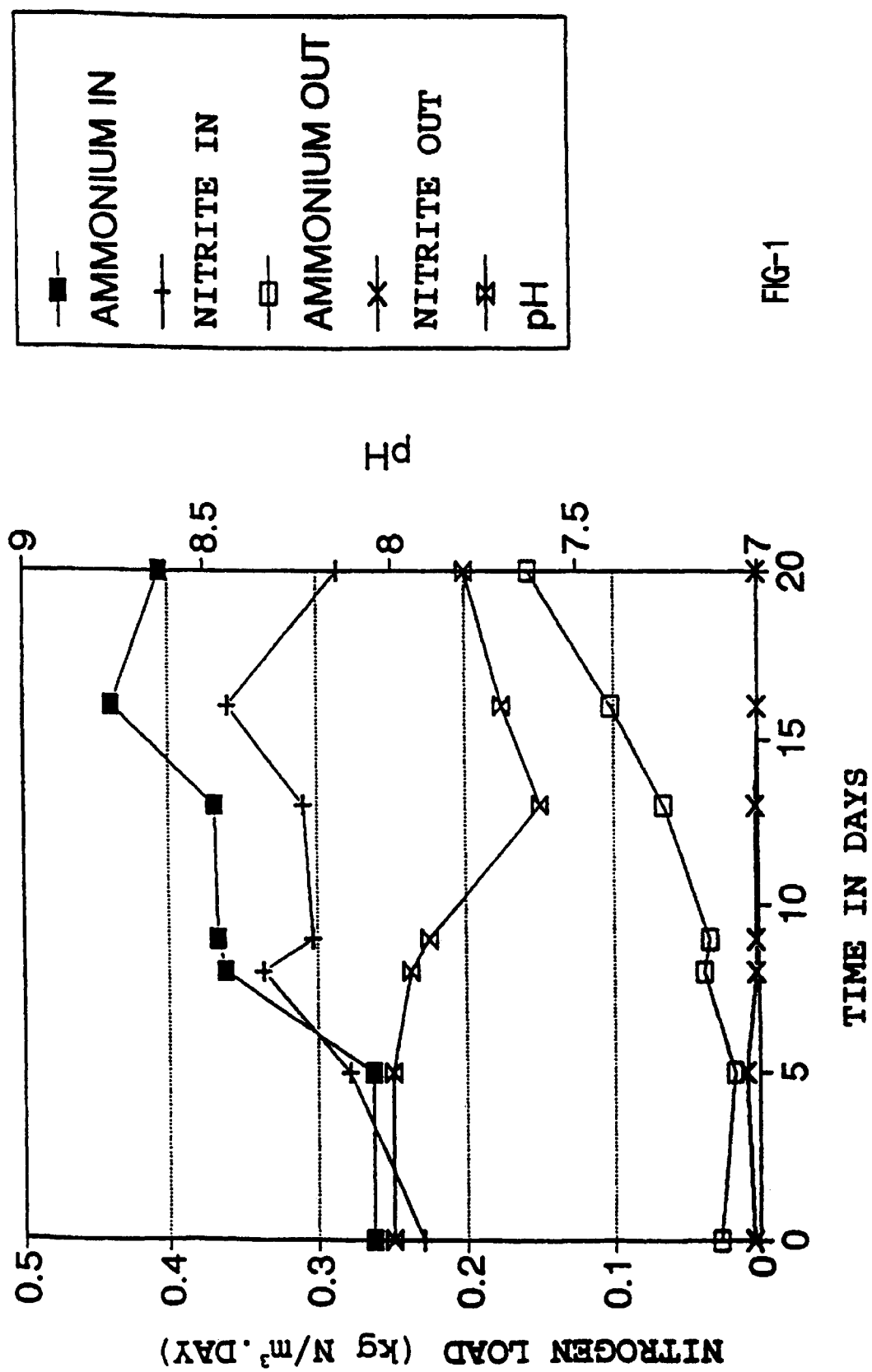
FIG. 1 shows relevant parameters of the invention.

A first favourable embodiment of the method is characterized in that in the first step the ammonia-containing waste water is fed to a nitritification reactor in an amount such that the nitritification reactor operates without sludge retention, the temperature of a solution subjected to nitritification is maintained at between 25 and 60° C. and the pH at between 6 and 7.2.

In this manner favourable conditions are provided for the conversion of ammonia to nitrite, not nitrate.

In the second step, the temperature of the solution in the denitritification reactor being subjected to the denitritification treatment is preferably maintained at between 25 and 60° C. and the pH at between 6 and 9.

In this manner favourable conditions are provided for the conversion of nitrite and ammonia into nitrogen.

According to a second embodiment of the method in accordance with the invention the first step and the second step are carried out simultaneously in one bioreactor, in which bioreactor nitrifying and denitrifying microorganisms are present in a solid phase, the nitrifying microorganism being substantially present in the outer, aerobic part of the solid phase and the denitrifying microorganism being substantially present in the anaerobic inner part of the solid phase, and oxygen, dependent on the ammonia concentration in the bioreactor, is supplied in an amount limiting the first step.

The advantage of this method is that only one reactor is required. The preferably somewhat rough carrier comprises a biofilm, that is to say a layer comprising the nitrifying and denitrifying microorganisms, and the first step takes place in the outer, aerobic part of the biofilm. Because of oxygen limitation, this outer, aerobic part of the biofilm is unable to convert more than 50% of the ammonia supplied and the ammonia, together with the nitrite formed in the outer, aerobic part of the biofilm, will be converted in the inner, aerobic part of the biofilm into nitrogen. The solid phase may consist of a spontaneously formed aggregate.

Preferably as solid phase a phase chosen from a biofilm-carrying particulate carrier and a biofilm-carrying immobile carrier is used.

If the carrier is particulate, the size of the carrier is preferably 0.1 to 1 mm. In this manner a high biomass density is provided and the size of the bioreactor can be kept to a limit. In a typical case the ammonia load of the biofilm surface is greater than 2–33 g $N/m^2 \cdot day$. Some roughness of the carrier surface is an advantage.

In the second step the temperature of a solution subjected to the denitritification-nitritification reaction in the reactor is preferably maintained at between and 60° C. and the pH at between 6 and 9.

This creates favourable conditions for the conversion of ammonia into nitrogen.

The invention will be further elucidated by means of the detailed specification hereinbelow referring to an Example of the method according to the invention, the parameters of which are given in the accompanying FIG. 1.

The method according to the present invention comprises a nitritification reaction and a denitritification reaction. As can be seen from the overall-reaction equation I shown on the formula sheet which is FIG. 2, and as will be elucidated below, no addition of pH-adjusting means is necessary. The nitritification according to reaction equation II yields two equivalents of protons per converted equivalent ammonia. In waste water that can be suitably treated by applying the invention, $HCO_3^-$ is the counter ion of the ammonia ion. Examples of such waste water include the percolation water from rubbish dumps and the effluent from anaerobic purifications. The supply of air necessary for the oxidation of ammonia during the nitritification reaction, also ensures that $CO_2$ is removed in accordance with reaction equation III. Accordingly, the nitrification reaction has a net yield of one equivalent acid per converted equivalent ammonia. The denitritification reaction according to reaction equation IV requires one equivalent acid per converted equivalent ammonia. This means that by using the $CO_2$ stripped effluent from the nitritification reactor, no pH adjustment is required.

By removing $CO_2$, the solution subjected to nitritification is stripped of $HCO_3^-$, lowering the buffering capacity of the solution. This means that its pH may vary, in particular that it may drop due to the formation of acid in this step. The pK of $HCO_3^-$, that is to say the pH at which $HCO_3^-$ buffers optimally, is 6.37. The drop of the pH inhibits the nitritification process, and ammonia is converted only partly but, according to the understanding provided by the present invention, to the desired extent (namely up to 50%). As a result, a suitable amount of ammonia is available for the subsequent denitritification process which uses acid and thus benefits from the low pH.

Without being bound to any theory, applicant assumes that the good controlling quality is achieved due to the fact that the nitritifying organism only perceives $NH_3$ and $HNO_2$ and not $NH_4^+$ and $NO_2^-$. When the pH drops the $NH_3$ (substrate) concentration decreases and the $HNO_2$ concentration which inhibits the nitritification reaction, increases.

EXAMPLE

An agitated batch reactor (2.4 l) was operated without sludge retention and fed with ammonia-rich waste water (41 mM; pH ≅8.0). During the day 80% of the reactor volume was replenished. The temperature was maintained at 33° C. and the dissolved oxygen concentration was 20%. Under these conditions the biomass concentration was 140 mg dry weight per litre. The pH of the reactor's effluent was about 6.7. N.B.: the pH was not adjusted by the addition of a substrate compound such as methanol. 40–50% of the ammonia in the waste water was converted.

1.2 ml/min of the effluent was fed into a fluidized-bed reactor (capacity 2 l). The pH in the fluidized-bed reactor was stable and was about 7.9. Kjeldahl nitrogen was converted in the fluidized-bed reactor at a rate of 0.6 kg $N/m^3$·day. The total removal of nitrogen was 83%. The relevant parameters are given in the Figure.

This percentage may be increased by returning a portion of the effluent from the fluidized-bed reactor to the batch reactor. Due to the stable pH in the fluidized-bed reactor the amount of return is not very critical and may be set at a permanent value. Too high a return results in an increased degradation of ammonia in the batch reactor. This causes the consumption of acid to drop in the fluidized-bed reactor, as a consequence of which the degradation of ammonia decreases again.

Although the method according to the invention has a substantially more self-regulatory nature and automatically results in an overall degradation of ammonia of at least about 80%, the pH of the contents of the nitritification reactor may optionally be adjusted by means of the supply of effluent from the denitritification reactor. Thus here no external additive whatsoever is added.

According to another embodiment of the method according to the invention, the waste water is fed to a denitritification step. During denitritification ammonia from the waste stream is used and a portion from the denitritification reactor is fed to the nitritification reactor. There nitrite is formed which is fed to the denitritification reactor.

In the event that the effluent from the denitritification step is discharged, said effluent may first be subjected to a nitrification step in order to avoid nitrite discharge.

Suitable microorganisms may be obtained without great difficulty from sludge of existing water-treatment plants in which ammonia is degraded, in the manner described in the literature. Alternatively, the culture for the denitrification may be obtained from the Central Bureau voor Schimmelcultures, Baarn, the Netherlands, registered under number 949.87.

What is claimed is:

1. An improved method of treating ammonia-comprising waste water, wherein in a first step ammonia-comprising waste water is subjected to a nitrification treatment by using a nitrifying microorganism and by addition of oxygen, yielding a solution comprising an oxidation product of ammonia, and in a second step the oxidation product of ammonia together with ammonia is converted into nitrogen, through influence of a denitrifying microorganism, wherein the improvement comprises using bicarbonate-containing waste water which is substantially stripped of bicarbonate by supplying air, and in the first step said ammonia-comprising waste water is fed to a nitrification reactor in an amount such that the nitrification reactor operates without sludge retention and pH is maintained at less than or equal to approximately 7.2 by controlling the aeration, thereby automatically limiting conversion of the ammonia present in the waste water into nitrite as the oxidation product of ammonia to up to fifty percent of said ammonia and substantially preventing conversion of said ammonia to nitrate, yielding a both ammonia and nitrite-containing solution, and in the second step the denitrifying microorganism uses the thus formed nitrite as oxidant for the remaining ammonia.

2. A method according to claim 1 wherein in the first step temperature of a solution subjected to nitrification is maintained at between approximately 25° and 60° C. and pH is between approximately 6 and 7.2.

3. A method according to claim 1 wherein in the second step, the temperature of the solution in the denitrificaton reactor being subjected to the denitrification treatment is maintained at between approximately 25° and 60° C. and the pH at between approximately 6 and 9.

4. A method according to claim 1 wherein a temperature of a solution in the reactor being subjected to a denitrification-nitrification treatment is maintained at between approximately 5° and 60° and the pH at between approximately 6 and 9.

\* \* \* \* \*